United States Patent
Fukaya

(10) Patent No.: US 11,546,486 B1
(45) Date of Patent: Jan. 3, 2023

(54) IMAGE FORMING APPARATUS WITH POWER SAVING FEATURES

(71) Applicant: TOSHIBA TEC KABUSHIKI KAISHA, Tokyo (JP)

(72) Inventor: Hideaki Fukaya, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/400,806

(22) Filed: Aug. 12, 2021

(51) Int. Cl.
| | |
|---|---|
| *H04N 1/44* | (2006.01) |
| *G06F 3/12* | (2006.01) |
| *H04N 1/00* | (2006.01) |
| *G06F 21/35* | (2013.01) |
| *G01J 5/00* | (2022.01) |
| *G01J 5/34* | (2022.01) |

(52) U.S. Cl.
CPC .......... *H04N 1/4426* (2013.01); *G01J 5/0025* (2013.01); *G01J 5/34* (2013.01); *G06F 3/1222* (2013.01); *G06F 3/1238* (2013.01); *G06F 21/35* (2013.01); *H04N 1/00037* (2013.01); *H04N 1/00082* (2013.01); *H04N 1/00395* (2013.01); *H04N 1/00411* (2013.01)

(58) Field of Classification Search
None
See application file for complete search history.

(56) References Cited

U.S. PATENT DOCUMENTS

| | | | |
|---|---|---|---|
| 2014/0092417 A1 | 4/2014 | Kuroishi et al. | |
| 2014/0139863 A1* | 5/2014 | Harada | H04N 1/4426 358/1.14 |
| 2015/0138581 A1* | 5/2015 | Aso | H04N 1/333 358/1.13 |

* cited by examiner

*Primary Examiner* — Thomas D Lee
(74) *Attorney, Agent, or Firm* — Foley & Lardner LLP

(57) ABSTRACT

An image forming apparatus includes an interface and a control circuit. The interface is configured to connect a contactless card reader. The control circuit is configured to acquire identification information read from an information recording medium by the contactless card reader and to decrease a field intensity level of the contactless card reader in response to a success of authentication of the identification information.

19 Claims, 5 Drawing Sheets

IMAGE FORMING APPARATUS WITH POWER SAVING FEATURES

FIELD

Embodiments described herein relate generally to an image forming apparatus.

BACKGROUND

An image forming apparatus including a human detection sensor for detecting whether or not a user is present near the image forming apparatus is known.

An image forming apparatus that authenticates identification information read from a card for personal authentication by a contactless card reader is known. The authentication is a technique for restricting setting of the image forming apparatus for each user and restricting access to an electronic file stored in the image forming apparatus for each user.

With the progress of power saving of electronic devices, power saving is required for at least one of the human detection sensor and the contactless card reader.

DETAILED DESCRIPTION

In general, according to one embodiment, an image forming apparatus includes an interface and a control circuit. The interface is configured to connect with a contactless card reader. The control circuit is configured to acquire identification information read from an information recording medium by the contactless card reader and to decrease a field intensity level of the contactless card reader based on success of authentication of the identification information.

Hereinafter, an embodiment will be described using the drawings.

System Configuration

Figure 1:
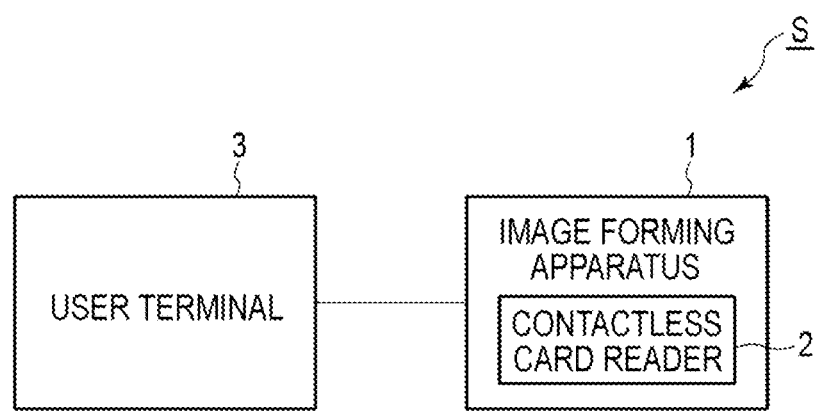
FIG. 1 is a block diagram illustrating a system including an image forming apparatus according to an embodiment.

FIG. 1 is a block diagram illustrating the summary of a system S including an image forming apparatus 1 according to an embodiment. The system S includes the image forming apparatus 1, a contactless card reader 2, and a user terminal 3. The image forming apparatus 1 and the contactless card reader 2 are connected to communicate with each other via a cable. The image forming apparatus 1 and the user terminal 3 are connected to communicate with each other in a wired or wireless manner via a network. For example, the network is a local area network (LAN). The system S refers to a system including two apparatuses among the image forming apparatus 1, the contactless card reader 2, and the user terminal 3.

The image forming apparatus 1 is an apparatus having an electrophotographic printing function. In the following description, it is assumed that the image forming apparatus 1 is a digital multi-function peripheral (MFP) having a copying function, a print function, a facsimile function, and a scanner function. A configuration example of the image forming apparatus 1 will be described below.

The contactless card reader 2 is an electronic apparatus that reads identification information from an information recording medium. The information recording medium is a medium that stores the identification information. For example, the information recording medium is an integrated circuit (IC) card. The information recording medium includes a chip and an antenna. The chip controls the information recording medium. The chip includes a storage area for information. In the storage area, the identification information is stored. The antenna is used for communicating with an external apparatus in a wireless manner. The antenna is used for receiving the supply of power from an external apparatus. The information recording medium is activated by receiving a radio wave from an external apparatus via the antenna. The information recording medium is activated to communicate with the external apparatus. The identification information is information on which each user can be identified. The identification information is used for allowing the image forming apparatus 1 to authenticate a user.

In order to adjust a reaction sensitivity of the information recording medium, the contactless card reader 2 can adjust a field intensity level of a radio wave emitted from the contactless card reader 2 to two or more levels. The field intensity level is the level of the field intensity. As the field intensity level increases, the field intensity increases. As the field intensity level increases, the power consumption of the contactless card reader 2 increases. An increase in field intensity level includes an increase in field intensity. A decrease in field intensity level includes a decrease in field intensity. The contactless card reader 2 includes a control circuit, an antenna, and a demodulation circuit. The control circuit can adjust the field intensity level. The antenna emits a radio wave having a field intensity level adjusted by the control circuit. The antenna receives a response wave of the emitted radio wave. The demodulation circuit demodulates the response wave. The demodulation circuit acquires the identification information by demodulating the response wave.

Here, an example in which the contactless card reader 2 can adjust the field intensity level to three levels will be described. The contactless card reader 2 emits a radio wave at an intensity of any one of a first field intensity level, a second field intensity level, and a third field intensity level. The first field intensity level is the highest level among the first field intensity level, the second field intensity level, and the third field intensity level. The second field intensity level is lower than the first field intensity level. The third field intensity level is lower than the second field intensity level. The contactless card reader 2 is not limited to adjusting the field intensity level to three levels. The contactless card reader 2 may adjust the field intensity level to two levels or may adjust the field intensity level to four or more levels.

The user terminal 3 is an electronic apparatus capable of information processing. For example, the user terminal 3 is a personal computer (PC), a tablet terminal, or a smartphone, but is not limited thereto. The user terminal 3 transmits print data to the image forming apparatus 1. The print data is data regarding a job relating to printing that is requested from the user terminal 3 to the image forming apparatus 1. The print data includes print settings input from the user through the user terminal 3. The print settings include various settings relating to printing, for example, a color mode, a paper type, a printing mode, the number of sheets to be printed, or a paper size. The paper is an example of the medium. The print data includes image data of a print target designated by the user through the user terminal 3. The print data includes identification information of the user.

Apparatus Configuration

Figure 2:
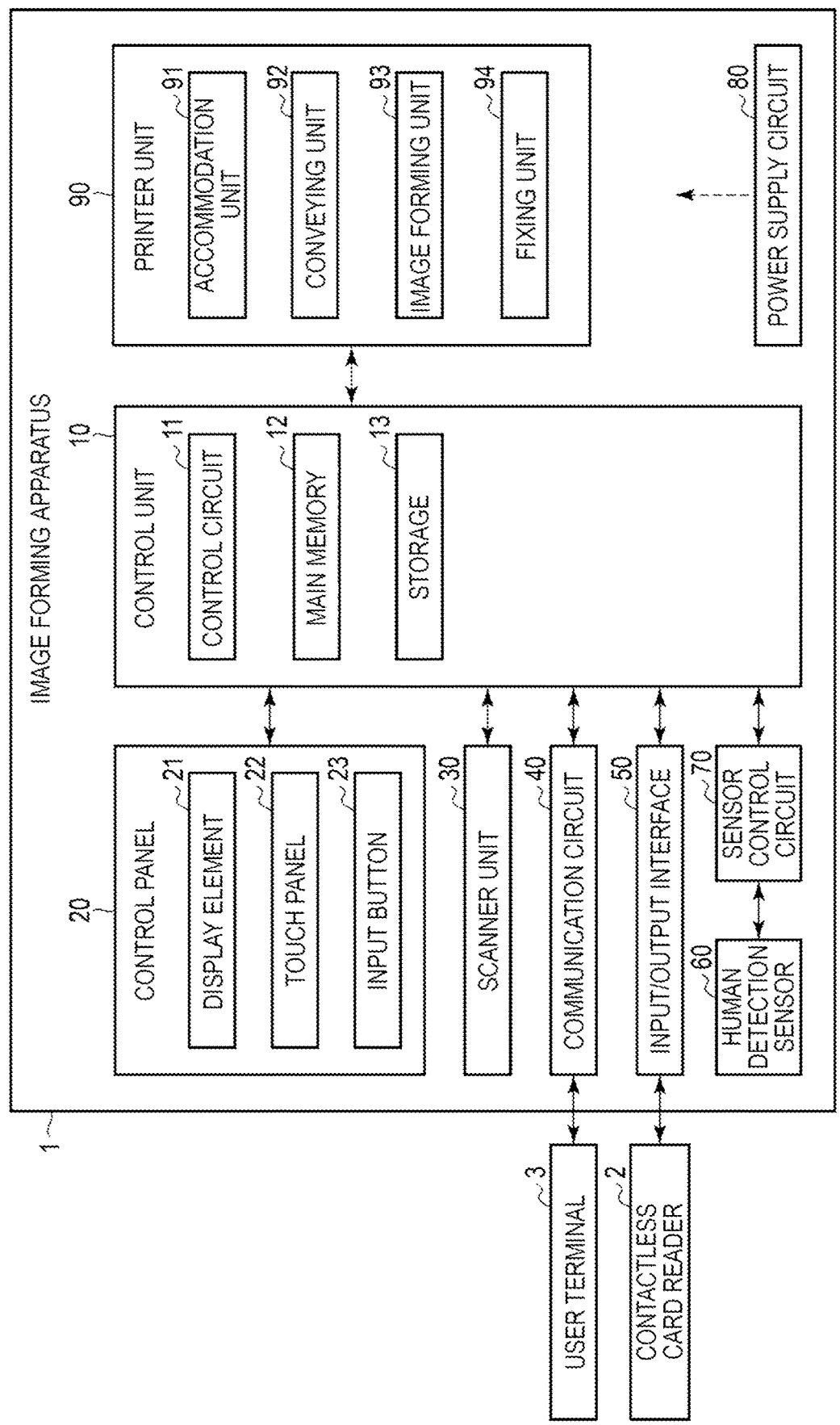
FIG. 2 is a block diagram illustrating a configuration example of the image forming apparatus.

FIG. 2 is a block diagram illustrating a configuration example of the image forming apparatus 1 according to an embodiment. The image forming apparatus 1 includes a control unit 10 (a controller), a control panel 20 (a user interface), a scanner unit 30 (a scanner), a communication circuit 40, an input and output interface 50, a human detection sensor 60, a sensor control circuit 70, a power supply circuit 80, and a printer unit 90 (a printer).

The control unit 10 controls operations of the various units in the image forming apparatus 1. The control unit 10 includes a control circuit 11, a main memory 12, and a storage 13.

The control circuit 11 corresponds to a central part of the image forming apparatus 1. The control circuit 11 includes a processor such as a central processing unit (CPU). In addition to or instead of the CPU, the control circuit 11 may include an application specific integrated circuit (ASIC), a field programmable gate array (FPGA), or a graphics processing unit (GPU). The control circuit 11 loads programs stored in advance in the main memory 12 or the storage 13 to the main memory 12. The control circuit 11 executes various operations by executing the programs loaded to the main memory 12.

The main memory 12 corresponds to a main memory part of the image forming apparatus 1. The main memory 12 includes a nonvolatile memory area and a volatile memory area. The main memory 12 stores an operating system or a program in the nonvolatile memory area. The main memory 12 uses the volatile memory area as a work area where data is appropriately rewritten by the control circuit 11. For example, the main memory 12 includes a read only memory (ROM) as the nonvolatile memory area. For example, the main memory 12 includes a random access memory (RAM) as the volatile memory area.

The storage 13 corresponds to an auxiliary storage part of the image forming apparatus 1. For example, the storage 13 includes a hard disk drive (HDD). In addition to or instead of the HDD, the storage 13 may include a semiconductor storage medium such as a solid state drive (SSD). The storage 13 stores the above-described programs, data used for the control circuit 11 to execute various processes, and data generated during the processes of the control circuit 11. The storage 13 may store print data.

The control panel 20 includes a display element 21 (a display, a display device, etc.), a touch panel 22, and an input button 23.

The display element 21 displays an image. The display element 21 is, for example, a liquid crystal display or an organic electroluminescence (EL) display, but is not limited thereto. The touch panel 22 is a device that forms a touch screen together with the display element 21 by being stacked on the display element 21. The touch panel 22 detects a touch of the user on the display element 21. The touch panel 22 is an example of an input interface that inputs an instruction of the user. The input button 23 is a pressable button such as a print start button. The input button 23 is an example of an input interface that inputs an instruction of the user.

The scanner unit 30 is a device that reads a character or an image such as a diagram or a picture that is drawn on paper placed at a predetermined position. The scanner unit 30 includes a line sensor. The line sensor may be a charge coupled device (CCD) type. The line sensor may be a contact image sensor (CIS) type. The scanner unit 30 generates image data based on the image read using the line sensor. The scanner unit 30 transmits the generated image data to the control unit 10. The control unit 10 stores the received image data in the storage 13 or transmits the received image data to the printer unit 90.

The communication circuit 40 is an interface for communication of the image forming apparatus 1 with an external apparatus. The communication circuit 40 is connected to communicate with the image forming apparatus 1 and the user terminal 3 via the network.

The input and output interface 50 is an interface that connects with the contactless card reader 2. The input and output interface 50 includes a connector of a cable that connects the image forming apparatus 1 and the contactless card reader 2 to each other.

The human detection sensor 60 detects the user who approaches the image forming apparatus 1. For example, the human detection sensor 60 is a passive sensor such as a pyroelectric infrared sensor, but is not limited thereto. The human detection sensor 60 may be an active sensor such as an ultrasonic sensor or a type of infrared sensor that emits laser light. The human detection sensor 60 can adjust a detection level to two or more levels. The detection level is a level relating to the detection. The detection level includes at least one of a detection distance level, a detection sensitivity level, and a detection frequency level. The detection distance is a distance from the human detection sensor 60 where the human detection sensor 60 can detect the user. The detection sensitivity is an accuracy at which the human detection sensor 60 detects the user in the detection distance. The detection frequency is a frequency where the human detection sensor 60 detects the user. If the human detection sensor 60 is an active sensor, the detection frequency can be changed. As the detection level increases, at least one of the detection distance level, the detection sensitivity level, and the detection frequency level also increases. As the detection distance level increases, the detection distance increases. As the detection sensitivity level increases, the detection sensitivity increases. As the detection frequency level increases, the detection frequency increases. As the detection level increases, the power consumption of the contactless card reader 2 increases. A decrease in detection level includes a decrease in the detection distance level. A decrease in detection distance level includes a decrease in detection distance. A decrease in detection level includes a decrease in detection sensitivity level. A decrease in detection sensitivity level includes a decrease in detection sensitivity. A decrease in detection level includes a decrease in detection frequency level. A decrease in detection frequency level includes a decrease in detection frequency.

The human detection sensor 60 may include a plurality of sensors having different detection levels. In this example, the human detection sensor 60 may be a type where the detection level is adjusted by switching between a plurality of sensors. The human detection sensor 60 may include one sensor. In this example, the human detection sensor 60 may be a type where the detection level is adjusted by mechanically or electrically adjusting one sensor.

Here, an example where the human detection sensor 60 can change the detection level to three levels will be described. The human detection sensor 60 detects the user at any one of a first detection level, a second detection level, and a third detection level. The first detection level includes at least one of a first detection distance level, a first detection sensitivity level, and a first detection frequency level. The second detection level includes at least one of a second detection distance level, a second detection sensitivity level, and a second detection frequency level. The third detection level includes at least one of a third detection distance level, a third detection sensitivity level, and a third detection frequency level.

The first detection level is the highest level among the first detection level, the second detection level, and the third detection level. The second detection level is lower than the first detection level. The third detection level is lower than the second detection level. The human detection sensor 60 is not limited to adjusting the detection level to three levels. The human detection sensor 60 may adjust the detection level to two levels or may adjust the detection level to four or more levels.

The sensor control circuit 70 controls the human detection sensor 60. The sensor control circuit 70 can adjust the detection level.

The power supply circuit 80 converts an alternating current power supplied from a commercial power supply into a direct current power and supplies the power to the respective units of the image forming apparatus 1. The power supply circuit 80 can be controlled by the control circuit 11.

The printer unit 90 may be a unit that forms an image on paper. For example, the printer unit 90 forms an image on paper based on image data transmitted from the user terminal 3 via the network. Here, an example of the printer unit 90 using a tandem type toner image transfer unit will be described. The printer unit 90 includes an accommodation unit 91, a conveying unit 92, an image forming unit 93, and a fixing unit 94.

The accommodation unit 91 accommodates paper. The accommodation unit 91 includes a paper feed cassette and a pickup roller. The paper feed cassette accommodates paper. The pickup roller picks up paper from the paper feed cassette one by one. The pickup roller supplies the picked paper to the conveying unit 92.

The conveying unit 92 conveys paper in the printer unit 90. The conveying unit 92 includes a plurality of rollers and a registration roller. The rollers include a roller that conveys the paper supplied by the pickup roller to the registration roller. The rollers include a roller that is provided downstream of the fixing unit 94 described below and discharges the paper to a paper discharge unit. The registration roller conveys the paper to a transfer unit of the image forming unit 93 described below at a timing where the transfer unit transfers a toner image to the paper.

The image forming unit 93 forms the toner image on the paper. The image forming unit 93 includes an intermediate transfer belt, a plurality of developing units, an exposure unit, and the transfer unit.

The intermediate transfer belt is an endless belt.

The developing units correspond to the number of the number of types of toners. The developing units include a developing unit for black, a developing unit for cyan, a developing unit for magenta, and a developing unit for yellow. Each of the developing units includes a photoconductive drum. Each of the developing units includes a charging unit, a developing device, a primary transfer roller, a cleaning unit, and a charge eraser that are provided in the vicinity of the photoconductive drum. The photoconductive drum includes a photoreceptor layer on a surface. The charging unit uniformly charges the photoreceptor layer on the surface of the photoconductive drum. The developing device develops an electrostatic latent image on the surface of the photoconductive drum with the toner. The developing device forms a toner image on the surface of the photoconductive drum. The primary transfer roller faces the photoconductive drum, and the intermediate transfer belt is interposed between the primary transfer roller and the photoconductive drum. The primary transfer roller transfers the toner image on the surface of the photoconductive drum to the intermediate transfer belt. The cleaning unit removes the toner that remains on the surface of the photoconductive drum without being transferred. The charge eraser irradiates the surface of the photoconductive drum with light. The charge eraser irradiates the photoreceptor layer of the photoconductive drum with light to erase charge.

The exposure unit irradiates the surface of the photoconductive drum of each of the developing units with laser light through an optical system such as a polygon mirror. The exposure unit forms an electrostatic pattern on the surface of the photoconductive drum as the electrostatic latent image.

The transfer unit transfers the toner image charged on the surface of the intermediate transfer belt to paper. The transfer unit includes a support roller and a secondary transfer roller that are configured such that the intermediate transfer belt and the paper are interposed therebetween from both sides in a thickness direction.

The fixing unit 94 applies heat and pressure to the paper on which the toner image supplied from the image forming unit 93 is formed. The fixing unit 94 fixes the formed toner image to the paper using the heat and pressure.

Figure 3:
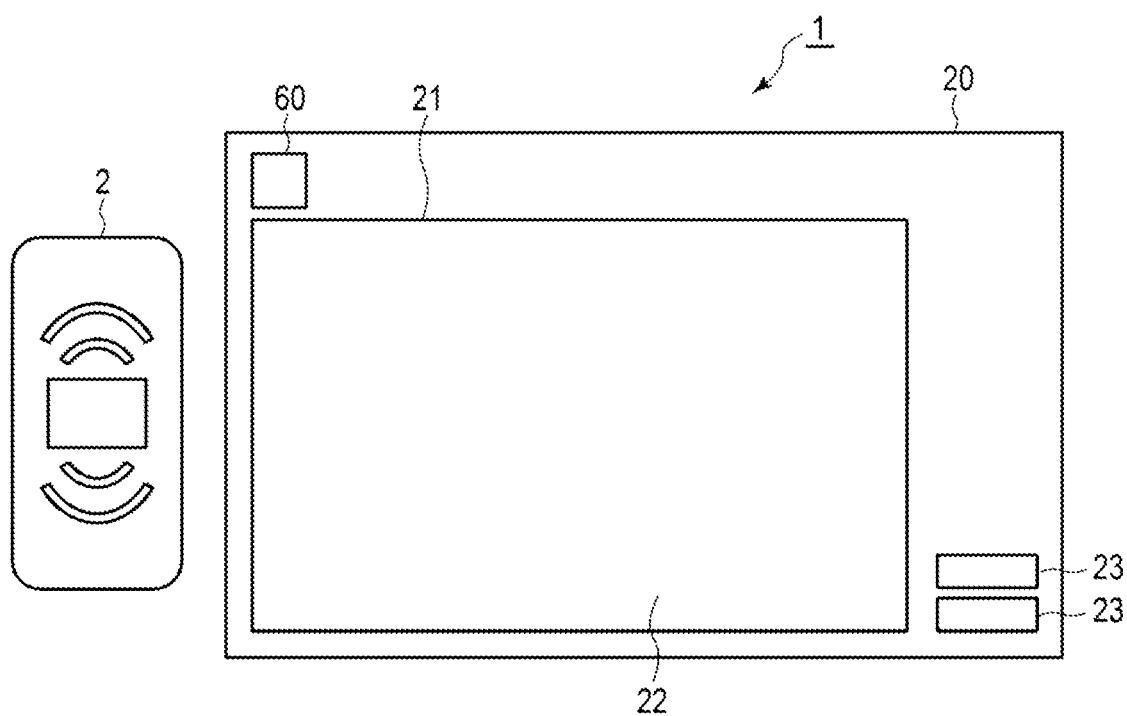
FIG. 3 is an appearance diagram illustrating a configuration example of a human detection sensor and a contactless card reader in the image forming apparatus.

FIG. 3 is an appearance diagram illustrating the summary of a configuration example of the human detection sensor 60 and the contactless card reader 2 in the image forming apparatus 1 according to the embodiment. The human detection sensor 60 is provided in the control panel 20 of the image forming apparatus 1. The contactless card reader 2 is provided near the control panel 20 of the image forming apparatus 1. Positions of the human detection sensor 60 and the contactless card reader 2 in the image forming apparatus 1 are not limited to these positions.

Control Operation

Figure 4:
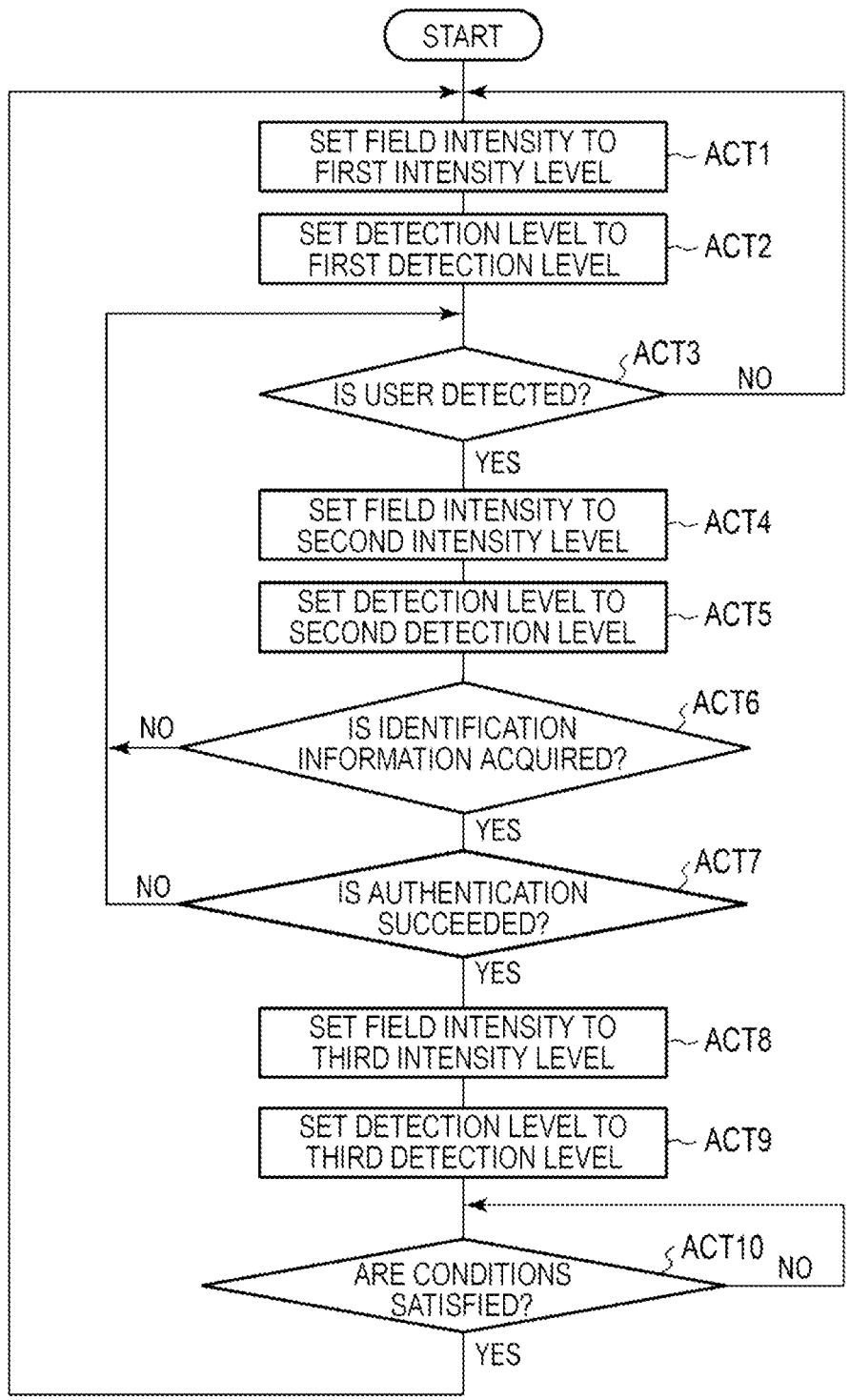
FIG. 4 is a flowchart illustrating a procedure of a control operation of a field intensity level and a detection level in the image forming apparatus.

FIG. 4 is a flowchart illustrating a procedure of a control operation of the field intensity level and the detection level in the image forming apparatus 1 according to the embodiment. A procedure described below is merely exemplary and may be changed as long as each of the processes can be executed. In the procedure, each of the processes may be removed or replaced depending on embodiments, and a new process can also be added.

The control circuit 11 starts the control operation of the field intensity level and the detection level based on power-ON of the image forming apparatus 1. The control circuit 11 ends the control operation of the field intensity level and the detection level based on power-OFF of the image forming apparatus 1.

The control circuit 11 sets the field intensity level to the first field intensity level (ACT 1). In ACT 1, for example, the control circuit 11 controls the contactless card reader 2 through the input and output interface 50 such that the contactless card reader 2 emits a radio wave at the first field intensity level. The contactless card reader 2 adjusts the field intensity level to the first field intensity level. The contactless card reader 2 emits a radio wave at the first field intensity level. By setting the field intensity level to the first field intensity level, the control circuit 11 can easily acquire the identification information from the recording medium if the control circuit 11 is not in an authentication state.

The control circuit 11 sets the detection level to the first detection level (ACT 2). In ACT 2, for example, the control circuit 11 controls the sensor control circuit 70 such that the human detection sensor 60 operates at the first detection level. The sensor control circuit 70 adjusts the detection level of the human detection sensor 60 to the first detection level. The human detection sensor 60 operates at the first detection level. By setting the detection level to the first detection level, the control circuit 11 can increase the detection accuracy of the user in a state where the user is not near the image forming apparatus 1.

The control circuit 11 determines whether or not the human detection sensor 60 is shifted from a non-detection state of the user to a detection state of the user (ACT 3). The non-detection state is a state where the human detection sensor 60 does not detect the user. The detection state is a state where the human detection sensor 60 detects the user. If the control circuit 11 determines that the human detection sensor 60 is not shifted from the non-detection state of the user to the detection state of the user (ACT 3, NO), the process shifts from ACT 3 to ACT 1. If the control circuit 11 determines that the human detection sensor 60 is shifted from the non-detection state of the user to the detection state of the user (ACT 3, YES), the process shifts from ACT 3 to ACT 4.

The control circuit 11 sets the field intensity level to the second field intensity level based on the shift of the human detection sensor 60 from the non-detection state of the user to the detection state of the user (ACT 4). In ACT 4, for example, the control circuit 11 controls the contactless card reader 2 through the input and output interface 50 such that the contactless card reader 2 emits a radio wave at the second field intensity level. The contactless card reader 2 adjusts the field intensity level to the second field intensity level. The contactless card reader 2 emits a radio wave at the second field intensity level. Setting the field intensity level to the second field intensity level includes changing the field intensity level from the first field intensity level to the second field intensity level. Changing the field intensity level from the first field intensity level to the second field intensity level is an example of decreasing the field intensity level. As described above, the control circuit 11 can decrease the field intensity level based on the shift from the non-detection state to the detection state. Since the user is present near the image forming apparatus 1, the user is more likely to hold the recording medium up near the contactless card reader 2. The contactless card reader 2 only needs to emit a radio wave at an intensity where the identification information can be read from the recording medium that is held up at a certain proximity. By decreasing the field intensity level, the control circuit 11 can decrease the power consumption of the contactless card reader 2. Since the contactless card reader 2 can read the identification information from the recording medium that is held up at a certain proximity, the convenience of the user does not deteriorate.

The control circuit 11 sets the detection level to the second detection level based on the shift of the human detection sensor 60 from the non-detection state of the user to the detection state of the user (ACT 5). In ACT 5, for example, the control circuit 11 controls the sensor control circuit 70 such that the human detection sensor 60 operates at the second detection level. The sensor control circuit 70 adjusts the detection level of the human detection sensor 60 to the second detection level. The human detection sensor 60 operates at the second detection level. Setting the detection level to the second detection level includes changing the detection level from the first detection level to the second detection level. Changing the detection level from the first detection level to the second detection level is an example of decreasing the detection level. As described above, the control circuit 11 can decrease the detection level based on the shift from the non-detection state to the detection state. Since the user is present near the image forming apparatus 1, the human detection sensor 60 does not need to continuously detect the user. By decreasing the detection level, the control circuit 11 can decrease the power consumption of the human detection sensor 60. Since the human detection sensor 60 detects the user in advance, the convenience of the user does not deteriorate.

The control circuit 11 acquires the identification information read from the information recording medium by the contactless card reader 2 (ACT 6). In ACT 6, for example, the control circuit 11 acquires, from the contactless card reader 2, the identification information read from the information recording medium through the input and output interface 50. If the control circuit 11 does not acquire the identification information (ACT 6, NO), the process shifts from ACT 6 to ACT 3. If the control circuit 11 acquires the identification information (ACT 6, YES), the process shifts from ACT 6 to ACT 7.

The control circuit 11 determines whether or not the authentication of the identification information is succeeded (ACT 7). In ACT 7, for example, the control circuit 11 compares the identification information acquired from the contactless card reader 2 to identification information of a plurality of users who are allowed to use the image forming apparatus 1. The storage 13 may store the identification information of the users who are allowed to use the image forming apparatus 1. The control circuit 11 determines that the authentication of the identification information is succeeded based on the fact that the identification information is included in the identification information of the users stored in the storage 13. The control circuit 11 determines that the authentication of the identification information is failed based on the fact that the identification information is not included in the identification information of the users stored in the storage 13. If the control circuit 11 determines that the authentication of the identification information is failed (ACT 7, NO), the process shifts from ACT 7 to ACT 3. If the control circuit 11 determines that the authentication of the identification information is succeeded (ACT 7, YES), the process shifts from ACT 7 to ACT 8.

The control circuit 11 sets the field intensity level of the contactless card reader 2 to the third field intensity level based on the success of the authentication of the identification information (ACT 8). In ACT 8, for example, the control circuit 11 controls the contactless card reader 2 through the input and output interface 50 such that the contactless card reader 2 emits a radio wave at the third field intensity level. The contactless card reader 2 adjusts the field intensity level to the third field intensity level. The contactless card reader 2 emits a radio wave at the third field intensity level. Setting the field intensity level to the third field intensity level includes changing the field intensity level from the second field intensity level to the third field intensity level. Changing the field intensity level from the second field intensity level to the third field intensity level is an example of decreasing the field intensity level. As described above, the control circuit 11 can decrease the field intensity level based on the success of the authentication of the identification information. Since the authentication of the identification information is succeeded, the user is less likely to hold the recording medium up near the contactless card reader 2 again. If the user holds the recording medium up near the contactless card reader 2, the user moves the recording medium close to the contactless card reader 2 and holds the recording medium up. The contactless card reader 2 only needs to emit a radio wave at an intensity where the identification information can be read from the recording medium that is held up at a certain proximity. By decreasing the field intensity level, the control circuit 11 can decrease the power consumption of the contactless card reader 2. Since the contactless card reader 2 can read the identification information from the recording medium that is held up at a certain proximity, the convenience of the user does not deteriorate.

The control circuit 11 sets the detection level to the third detection level based on the success of the authentication of the identification information (ACT 9). In ACT 9, for example, the control circuit 11 controls the sensor control circuit 70 such that the human detection sensor 60 operates at the third detection level. The sensor control circuit 70 adjusts the detection level of the human detection sensor 60 to the third detection level. The human detection sensor 60 operates at the third detection level. Setting the detection level to the third detection level includes changing the detection level from the second detection level to the third detection level. Changing the detection level from the second detection level to the third detection level is an example of decreasing the detection level. As described above, the control circuit 11 can decrease the detection level based on the success of the authentication of the identification information. Since the user is present near the image forming apparatus 1, the human detection sensor 60 does not need to continuously detect the user. Another user is less likely to approach the image forming apparatus 1. By decreasing the detection level, the control circuit 11 can decrease the power consumption of the human detection sensor 60. Since the human detection sensor 60 does not need to detect the user or another user, the convenience of the user does not deteriorate.

The control circuit 11 determines whether or not conditions are satisfied (ACT 10). The conditions are for increasing at least one of the field intensity level and the detection level. The conditions will be described below. If the control circuit 11 determines that the conditions are not satisfied (ACT 10, NO), the process of ACT 10 is repeated. If the control circuit 11 determines that the conditions are satisfied (ACT 10, YES), the process shifts from ACT 10 to ACT 1.

The conditions include at least one of a first condition, a second condition, and a third condition and may include conditions other than the herein-described conditions.

The first condition is whether or not the human detection sensor 60 is shifted from the detection state of the user to the non-detection state of the user. The first condition being satisfied represents that the human detection sensor 60 is shifted from the detection state of the user to the non-detection state of the user.

The second condition is whether or not release of the authentication state is input by the user through the touch panel 22 or the input button 23. The authentication state is a state where the authentication is continued after the success of the authentication by the control circuit 11. The authentication state is a state where the user whose authentication is succeed allows the use of the image forming apparatus 1. The release of the authentication state includes allowing authentication of another user by the control circuit 11. The second condition being satisfied represents the input for the release of the authentication state by the user.

The third condition is whether or not a set time is elapsed. The set time is a period of time that is set at a given timing as a starting point after the success of the authentication by the control circuit 11. The set time is a period of time corresponding to the operation time of the printer unit 90 based on a job. The set time varies depending on the operation time of the printer unit based on a job. An example in which the control circuit 11 acquires the set time will be described below. The third condition being satisfied represents the elapse of the set time.

Regarding the first condition, the processes of ACT 1 and ACT 2 will be described.

In ACT 1, the control circuit 11 sets the field intensity level of the contactless card reader 2 to the first field intensity level based on the fact that the first condition is satisfied. Setting the field intensity level to the first field intensity level includes changing the field intensity level from the third field intensity level to the first field intensity level. Changing the field intensity level from the third field intensity level to the first field intensity level is an example of increasing the field intensity level. This way, after decreasing the field intensity level based on the success of the authentication, the control circuit 11 increases the field intensity level based on the fact that the first condition is satisfied. Since the user is not present near the image forming apparatus 1, another user may approach the image forming apparatus 1. By increasing the field intensity level, the control circuit 11 can easily acquire identification information from a recording medium of another user if the control circuit 11 is not in the authentication state. By changing the field intensity level in a range where the convenience of the user does not deteriorate, the control circuit 11 can decrease the power consumption of the contactless card reader 2.

In ACT 2, the control circuit 11 sets the detection level to the first detection level based on the fact that the first condition is satisfied. Setting the detection level to the first detection level includes changing the detection level from the third detection level to the first detection level. Changing the detection level from the third detection level to the first detection level is an example of increasing the detection level. This way, after decreasing the detection level based on the success of the authentication, the control circuit 11 increases the detection level based on the fact that the first condition is satisfied. Since the user is not present near the image forming apparatus 1, another user may approach the image forming apparatus 1. By increasing the detection level, the control circuit 11 can increase the detection accuracy of another user. By changing the detection level in a range where the convenience of the user does not deteriorate, the control circuit 11 can decrease the power consumption of the human detection sensor 60.

Regarding the second condition, the processes of ACT 1 and ACT 2 will be described.

In ACT 1, the control circuit 11 sets the field intensity level of the contactless card reader 2 to the first field intensity level based on the fact that the second condition is satisfied. This way, after decreasing the field intensity level based on the success of the authentication, the control circuit 11 increases the field intensity level based on the fact that the second condition is satisfied. By releasing the authentication state, the user is more likely to become distant from the image forming apparatus 1. Therefore, another user is likely to approach the image forming apparatus 1. By increasing the field intensity level, the control circuit 11 can easily acquire identification information from a recording medium of another user if the control circuit 11 is not in the authentication state. By changing the field intensity level in a range where the convenience of the user does not deteriorate, the control circuit 11 can decrease the power consumption of the contactless card reader 2.

In ACT 2, the control circuit 11 sets the detection level to the first detection level based on the fact that the second condition is satisfied. This way, after decreasing the detection level based on the success of the authentication, the control circuit 11 increases the detection level based on the fact that the second condition is satisfied. By releasing the authentication state, the user is more likely to become distant from the image forming apparatus 1. Therefore, another user is likely to approach the image forming apparatus 1. By increasing the detection level, the control circuit 11 can increase the detection accuracy of another user. By changing the detection level in a range where the convenience of the user does not deteriorate, the control circuit 11 can decrease the power consumption of the human detection sensor 60.

Regarding the third condition, the processes of ACT 1 and ACT 2 will be described.

In ACT 1, the control circuit 11 sets the field intensity level of the contactless card reader 2 to the first field intensity level based on the fact that the third condition is satisfied. This way, after decreasing the field intensity level based on the success of the authentication, the control circuit 11 increases the field intensity level based on the fact that the third condition is satisfied. After the end of the process based on the job by the image forming apparatus 1, the user is more likely to become distant from the image forming apparatus 1. Therefore, another user is likely to approach the image forming apparatus 1. By increasing the field intensity level, the control circuit 11 can easily acquire identification information from a recording medium of another user if the control circuit 11 is not in the authentication state. By changing the field intensity level in a range where the convenience of the user does not deteriorate, the control circuit 11 can decrease the power consumption of the contactless card reader 2.

In ACT 2, the control circuit 11 sets the detection level to the first detection level based on the fact that the third condition is satisfied. This way, after decreasing the detection level based on the success of the authentication, the control circuit 11 increases the detection level based on the fact that the third condition is satisfied. After the end of the process based on the job by the image forming apparatus 1, the user is more likely to become distant from the image forming apparatus 1. Therefore, another user is likely to approach the image forming apparatus 1. By increasing the detection level, the control circuit 11 can increase the detection accuracy of another user. By changing the detection level in a range where the convenience of the user does not deteriorate, the control circuit 11 can decrease the power consumption of the human detection sensor 60.

The example where the control circuit 11 changes both the field intensity level and the detection level is described, but the embodiment is not limited thereto. The control circuit 11 does not need to change the field intensity level. In this example, the control circuit 11 does not execute the processes of ACT 4 and ACT 8. The control circuit 11 does not need to change the detection level. In this example, the control circuit 11 does not execute the processes of ACT 5 and ACT 9.

The third field intensity level may be a level where the field intensity is 0. In this example, the contactless card reader 2 does not emit a radio wave at the third field intensity level. The third detection level may be a level where the detection distance, the detection sensitivity, and the detection frequency are 0. The detection frequency being 0 represents that the human detection sensor 60 does not detect the user constantly. In this example, the human detection sensor 60 does not detect the user at the third detection level irrespective of the position of the user relative to the human detection sensor 60.

Figure 5:
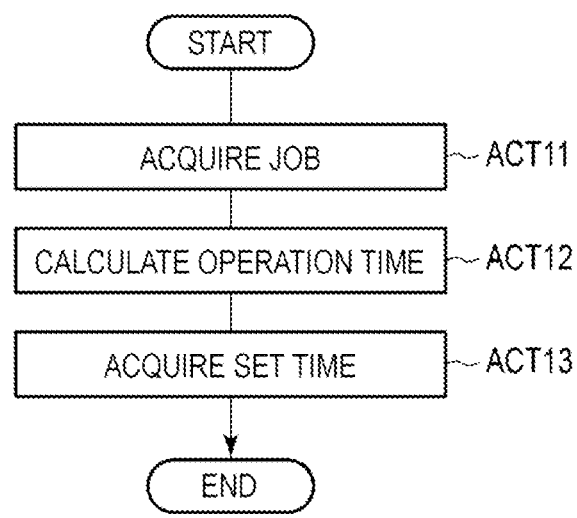
FIG. 5 is a flowchart illustrating a procedure of an acquisition operation of a set time in the image forming apparatus.

FIG. 5 is a flowchart illustrating a procedure of an acquisition operation of the set time in the image forming apparatus 1 according to the embodiment. A procedure described below is merely exemplary and may be changed as long as each of the processes can be executed. In the procedure, each of the processes may be removed or replaced depending on embodiments, and a new process can also be added.

In the authentication state, the control circuit 11 acquires a job based on an input from the user through the touch panel 22 or the input button 23 (ACT 11). In ACT 11, for example, the control circuit 11 acquires the job to be executed that is selected by the user. The job will be described by using, as an example, a job relating to printing based on print data transmitted from the user terminal 3 to the image forming apparatus 1, but the embodiment is not limited thereto. The job may relate to the operation of the image forming apparatus 1. The job may relate to copying or scanning.

The control circuit 11 calculates the operation time of the printer unit 90 based on the job (ACT 12). In ACT 12, for example, the control circuit 11 calculates the operation time based on a print setting in the print data relating to the job to be executed that is selected by the user. The operation time may vary depending on the number of sheets to be printed. The calculation of the operation time of the printer unit 90 based on the print setting may be implemented by using a well-known technique.

The control circuit 11 acquires the set time based on the operation time (ACT 13). The set time may be a period of time having the same length as or a longer length than the operation time. The control circuit 11 may set, as a starting point of the set time, a start timing of the process based on the job by the printer unit 90.

As described above, the control circuit 11 can acquire the set time that varies depending on the operation time of the printer unit based on the input job. The control circuit 11 can set a timing of increasing the field intensity level or the detection level to be close to a timing where the user is more likely to become distant from the image forming apparatus 1. The control circuit 11 can decrease the power consumption of the contactless card reader 2 or the human detection sensor 60 in a range where the convenience of the user does not deteriorate.

A modification example of the above-described embodiment will be described.

The detection level may include a detection time level. The detection time is a period of time set in order to enable the detection of the user by the human detection sensor 60. The detection is enabled during the set period of time and subsequently is disabled after the set period of time. If the human detection sensor 60 is a passive sensor, the detection time can be changed. As the detection time level increases, the detection time increases. A decrease in detection level includes a decrease in detection time level. A decrease in detection time level includes a decrease in detection time. The first detection level includes a first detection time level. The second detection level includes a second detection time level. The third detection level includes a third detection time level. If the detection time level is at the highest level such as the first detection time level, the detection of the user by the human detection sensor 60 may be enabled constantly. If the detection time level is at the lowest level such as the third detection time level, the detection time may be 0. The detection time being 0 represents that the detection of the user by the human detection sensor 60 is disabled constantly. The human detection sensor 60 receives power supply irrespective of the detection time. However, as the detection time decreases, the utilization of the processor in the control circuit 11 can be decreased.

The embodiment is described using the image forming apparatus but is not limited thereto. The embodiment is applicable to an apparatus that includes a human detection sensor and can be connected to a contactless card reader. The embodiment is also applicable to a point of sales (POS) apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   a human detection sensor;
   an interface configured to connect a contactless card reader; and
   a control circuit configured to:
   acquire identification information read from an information recording medium by the contactless card reader; and
   decrease a field intensity level of the contactless card reader in response to a success of authentication of the identification information;
   wherein, after decreasing the field intensity level based on the success of the authentication, the control circuit is configured to increase the field intensity level in response to a shift of the human detection sensor from a detection state of a user to a non-detection state of the user.

2. The image forming apparatus of claim 1, wherein, after decreasing the field intensity level based on the success of the authentication, the control circuit is configured to increase the field intensity level in response to an input received by the control circuit from a user interface to release an authentication state.

3. The image forming apparatus of claim 1, wherein, after decreasing the field intensity level based on the success of the authentication, the control circuit is configured to increase the field intensity level in response to a set time elapsing.

4. The image forming apparatus of claim 3, further comprising a printer, wherein the set time varies depending on an operation time of the printer based on a job being performed thereby.

5. The image forming apparatus of claim 1, wherein the control circuit is configured to decrease a detection level of the human detection sensor based on the success of the authentication.

6. The image forming apparatus of claim 5, wherein, after decreasing the detection level based on the success of the authentication, the control circuit is configured to increase the detection level in response to the shift of the human detection sensor from the detection state of the user to the non-detection state of the user.

7. The image forming apparatus of claim 5, wherein, after decreasing the detection level based on the success of the authentication, the control circuit is configured to increase the detection level in response to an input received by the control circuit from a user interface to release an authentication state.

8. The image forming apparatus of claim 5, wherein, after decreasing the detection level based on the success of the authentication, the control circuit is configured to increase the detection level in response to a set time elapsing.

9. The image forming apparatus of claim 8, further comprising a printer, wherein the set time varies depending on an operation time of the printer based on a job being performed thereby.

10. An image forming apparatus comprising:
    a reader operable at a plurality of field intensity levels;
    a detection sensor operable at a plurality of detection levels; and
    a control circuit configured to:
    set the reader to a first field intensity level and set the detection sensor to a first detection level;
    receive a detection indication from the detection sensor that an operator is detected;
    set the reader to a second field intensity level and set the detection sensor to a second detection level in response to the detection indication, the second field intensity level and the second detection level being lower than the first field intensity level and the first detection level, respectively;
    acquire identification information of a user read by the reader from an information recording medium; and
    set the reader to a third field intensity level and set the detection sensor to a third detection level and enter an authenticated state in response to successfully authenticating the user based on the identification information, the third field intensity level and the third detection level being lower than the second field intensity level and the second detection level, respectively.

11. The image forming apparatus of claim 10, wherein at least one of the third field intensity level is zero or the third detection level is zero.

12. The image forming apparatus of claim 10, wherein the control circuit is configured to return the reader to the first field intensity level and the detection sensor to the first detection level in response to determining that a condition is satisfied.

13. The image forming apparatus of claim 12, wherein the condition includes a shift of the detection sensor from a detection state to a non-detection state of the user.

14. The image forming apparatus of claim 12, further comprising a user interface, wherein the condition includes an input received by the control circuit from the user interface to release the authenticated state.

15. The image forming apparatus of claim 12, wherein the condition includes a set time elapsing.

16. The image forming apparatus of claim 15, wherein the set time varies depending on an operation time of the image forming apparatus based on a job being performed thereby, and wherein the job includes at least one of copying, scanning, or printing.

17. The image forming apparatus of claim 16, wherein the set time is greater than or equal to the operation time.

18. The image forming apparatus of claim 10, wherein each of the plurality of detection levels includes at least one of a detection distance level, a detection sensitivity level, or a detection frequency level.

19. A method for controlling an image forming apparatus, the method comprising:
- setting, by a control circuit of the image forming apparatus, a reader of the image forming apparatus to a first field intensity level and a detection sensor of the image forming apparatus to a first detection level;
- receiving, by the control circuit, a detection indication from a detection sensor of the image forming apparatus that an operator is detected;
- setting, by the control circuit, the reader to a second field intensity level and the detection sensor to a second detection level in response to the detection indication, the second field intensity level and the second detection level being lower than the first field intensity level and the first detection level, respectively;
- acquiring, by the control circuit, identification information of a user read by the reader from an information recording medium; and
- setting, by the control circuit, the reader to a third field intensity level and the detection sensor to a third detection level and entering, by the control circuit, an authenticated state in response to successfully authenticating the user based on the identification information, the third field intensity level and the third detection level being lower than the second field intensity level and the second detection level, respectively.

* * * * *